April 26, 1932. A. SAPIER 1,855,773
FILM FEEDING MEANS FOR MOTION PICTURE PROJECTORS
Filed June 22, 1929 2 Sheets-Sheet 1
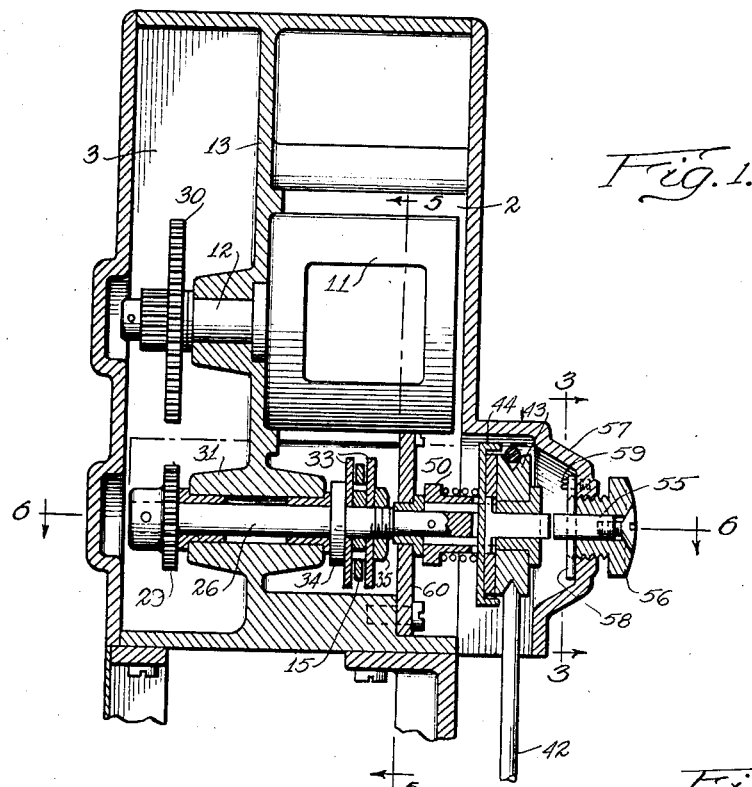
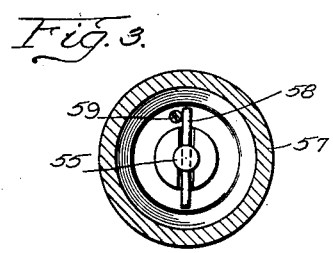
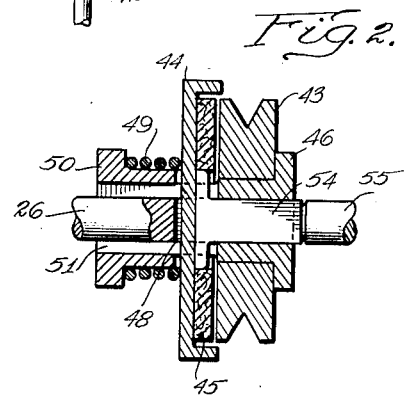
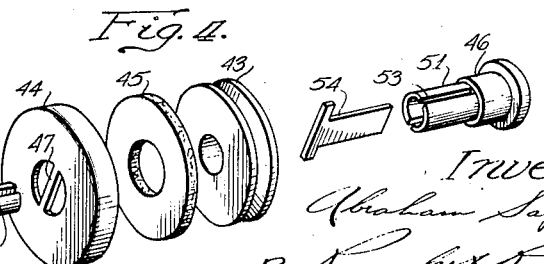

April 26, 1932. A. SAPIER 1,855,773
FILM FEEDING MEANS FOR MOTION PICTURE PROJECTORS
Filed June 22, 1929 2 Sheets-Sheet 2
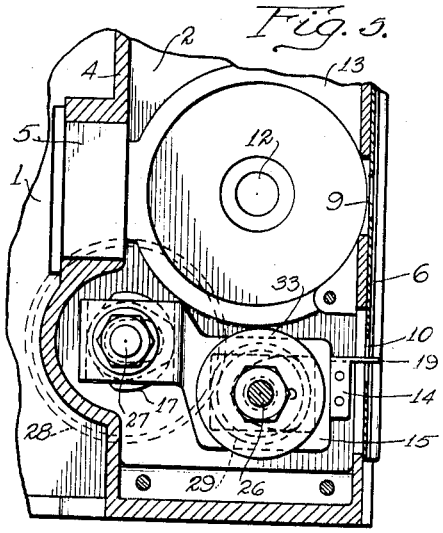
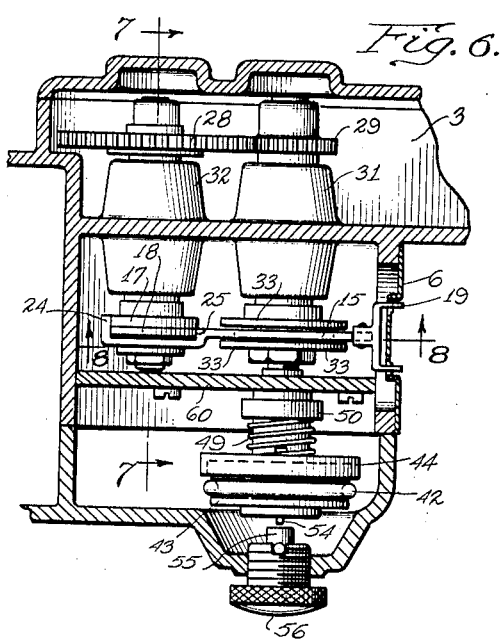
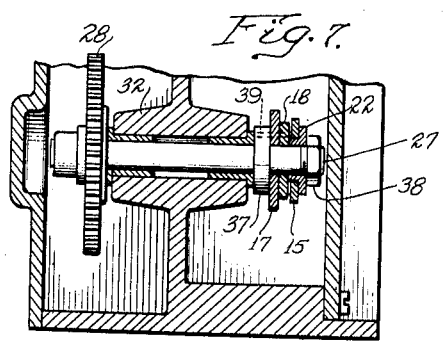
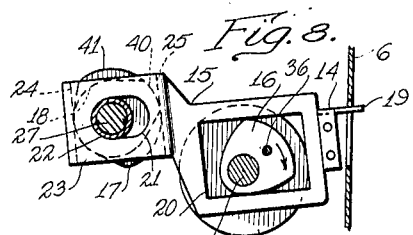
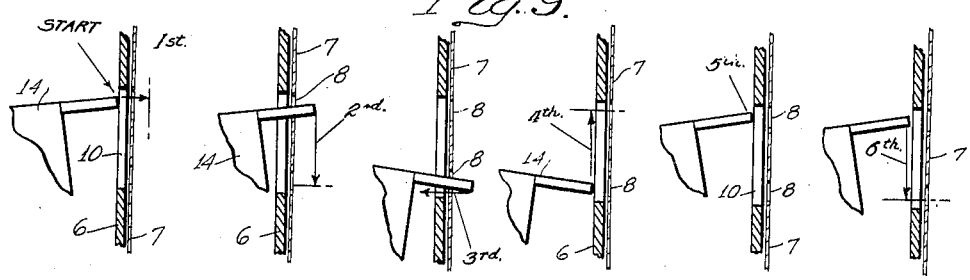
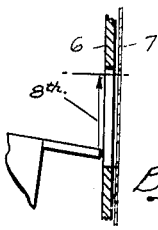

Patented Apr. 26, 1932

1,855,773

UNITED STATES PATENT OFFICE

ABRAHAM SAPIER, OF CHICAGO, ILLINOIS, ASSIGNOR TO UNIVERSAL STAMPING & MFG. CO., OF CHICAGO, ILLINOIS, A CORPORATION OF ILLINOIS

FILM FEEDING MEANS FOR MOTION PICTURE PROJECTORS

Application filed June 22, 1929. Serial No. 372,867.

The main objects of this invention are to provide a motion picture machine having improved means for intermittently feeding the film to momentarily position each picture in front of the light aperture; to provide improved film feeding means which will increase the speed at which the pictures enter and leave the path of light so as to lengthen the pause of each picture in front of the light aperture and thereby increase the light efficiency of the machine; to provide improved mechanism for operating said feeding means; and to provide an improved form of clutch for connecting said feeding means and operating mechanism.

An illustrative embodiment of this invention is shown in the accompanying drawings, wherein:—

Figure 1 is a transverse vertical section of a motion picture projecting machine having an improved film feeding means.

Fig. 2 is an enlarged sectional detail of the improved clutch.

Fig. 3 is a vertical section, taken on the line 3—3 of Fig. 1.

Fig. 4 is a perspective showing the clutch elements separated from one another.

Fig. 5 is a longitudinal vertical section, taken on the line 5—5 of Fig. 1.

Fig. 6 is a horizontal section, taken on the line 6—6 of Fig. 1.

Fig. 7 is a transverse vertical section, taken on the line 7—7 of Fig. 6.

Fig. 8 is a vertical section taken on the line 8—8 of Fig. 6 and showing the film feeding claw and actuating cams.

Fig. 9 is a series of sectional views showing successive positions of the feeding claw.

The improved film feeding means to which this invention is applied may be used in connection with motion picture projecting machines of the type disclosed in my co-pending applications Serial No. 369,126, filed June 7, 1929, and Serial No. 370,522, filed June 13, 1929.

Inasmuch as this invention relates particularly to the means for feeding the film, the accompanying drawings show only as much of the entire projector as will be of assistance in apprehending the invention.

The projecting machine to which the improved feeding means is applied and which is more fully illustrated in said copending applications, includes an upright casing having a rear compartment for housing the usual light bulb and a forward compartment in which is mounted a rotatable light interceptor for interrupting the light rays passing through the light aperture in the front wall of the casing. A lateral compartment houses the train of gears which drives the light interceptor and film sprockets.

The improved film feeding means includes a cam actuated claw movable into engagement with the usual marginal perforations in the film for intermittently feeding the film.

In the use of motion picture projecting machines, it is frequently desirable to stop the film and light interceptor for the purpose of exhibiting a "still" picture. However, during the display of a "still" picture, the motor must continue in operation for actuating the ventilating fan which prevents overheating of the compartment containing the light bulb. For this reason, an improved form of clutch connects the motor with the film feeding means and light interceptor so as to permit the interceptor and claw to be quickly stopped.

In the construction illustrated, the casing of the machine, which is only partly shown, includes a rear compartment 1 for housing the usual reflector and light bulb, a forward compartment 2 for housing the light interceptor and the improved film feeding means, and a lateral compartment 3 for housing the gear train which drives the interceptor and film sprockets, not shown.

Located between the compartments 1 and 2, is a partition 4 in which is mounted the usual light condenser 5.

Supported on the front wall of the casing, is a vertically disposed guide 6 for a film 7 having the usual marginal perforations 8. The guide 6 has the usual light aperture 9, and a pair of vertically disposed slots 10 which accommodate the claw of the improved film feeding means. The usual lens and film framer, not shown, are supported on the casing directly in front of the light aperture 9.

The light interceptor, not shown, is located within a stationary shell 11, mounted in the compartment 2. The interceptor is supported on a shaft 12 journaled on a partition 13 between the compartments 2 and 3.

In the form shown, the improved film feeding means comprises a claw 14 mounted on a feeder 15, which is moved through a cyclic path by rotatable cams 16, 17 and 18 for reciprocating the claw vertically and horizontally. The claw 14 has a pair of prongs 19, which are movable through the slots 10 for engagement with the marginal perforations of the film.

The feeder 15 is preferably a stamping having a rectangular opening 20 for accommodating the cam 16 and a slot 21 for accommodating the hub of a washer 22. The feeder has an offset portion 23 providing shoulders 24 and 25 for engaging the cams 17 and 18, respectively.

The cam 16 is arranged to reciprocate the claw vertically and the cams 17 and 18 are arranged to reciprocate the claw horizontally for advancing and retracting the claw relative to the film guideway. The cam 16 is fixed on a drive shaft 26, which is connected to the driving mechanism by the improved clutch hereinafter described, and the cams 17 and 18 are fixed on a shaft 27 which is geared to the shaft 26 by gears 28 and 29 located in the compartment 3. The gear 28 also meshes with a gear 30 fixed on the light interceptor shaft 12 for driving the interceptor, not shown.

In the form shown, the shafts 26 and 27 are disposed substantially parallel to each other and are journaled in bearings 31 and 32, respectively, formed on the partition 13.

Supported on the shaft 26, is a pair of washers 33 which embrace the cam 16 and form a guideway for the feeder 15. The washers 33 are clamped between a flange 34 formed on the shaft 26 and a nut 35. One of the washers 33 is secured to the flange 34 and cam 16 by a pin 36.

In the construction shown, the cams 17 and 18 and washer 22 are clamped between a flange 37 formed on the shaft 27 and a nut 38. The cams 17 and 18 and flange 37 are secured against relative turning by a pin 39.

The gears 28 and 29 have a ratio of two to one so that the shaft 26 rotates at twice the speed of the shaft 27, thereby causing the claw 14 to make two reciprocations vertically for each horizontal reciprocation. As illustrated in Fig. 9, each complete cycle of the feeding claw is divided into eight equal intervals. During one of the intervals, the claw is held in effective engagement with the film by means of the cam 18 and during the remaining seven intervals the claw is held in an ineffective retracted position by the cam 17.

The cam 18 has a comparatively short crest 40 adapted to engage the shoulder 25 for holding the claw in effective feeding position during the second interval of the cycle, illustrated in Fig. 9, and the cam 17 has a comparatively long crest 41 adapted to engage the shoulder 24 for holding the claw retracted during the remaining seven intervals of each cycle.

The driving mechanism, which drives the film feeding means and light interceptor, includes a belt 42 connected to an electric motor, not shown. The belt 42 drives the main shaft 26 by means of an improved clutch which comprises a driving member 43, a driven member 44 and an intermediate friction washer 45, embracing the main shaft 26.

The driving member 43 is in the form of a pulley connected to the belt 42 and loosely supported on a bearing 46 which is fixed on the shaft 26. The driven member 44 is in the form of a cup washer having a central pin 47 seated in a slot 48 formed in the shaft 26. The member 44 is yieldingly urged axially toward the pulley 43 by means of a helical spring 49 embracing a sleeve 50, which is mounted on a reduced part 51 of the bearing 46. The sleeve 50 has a slot 52 for accommodating the pin 47 of the driven member 44.

Formed in the reduced end 51 of the bearing 46, is a slot 53 for accommodating an axially movable key 54, which is seated in the slot 48 of the shaft for retracting the member 44 to disengage the clutch. The key 54 is manually actuated by means of a bolt 55 adapted to bear against the outer extremity of the key. The bolt 55 is mounted in a rotatable knob 56, which is threaded in a wall 57 of the casing. Mounted on the bolt 55, is a pin 58 adapted to engage a stud 59 on the casing wall 57 for limiting the rotation of the knob.

The main shaft 26 also has a bearing 60 located between the nut 35 and the sleeve 50.

In operation, the shafts 26 and 27 are rotated by the belt 42 and intermediate clutch for moving the feeder 15 through a cyclic path under the action of the cams 16, 17 and 18. As illustrated in Fig. 9, during the first interval of the cycle, the claw 14 advances toward the film under the action of the cam 18. During the second interval, the cam 16 moves the claw downwardly for feeding the film one step and during the remaining intervals the claw is retracted by the cam 17.

While the claw is retracted by the cam 17, it moves inwardly for the third interval of the cycle; moves upwardly for the fourth interval; pauses for the fifth interval; moves downwardly for the sixth interval; pauses for the seventh and moves upwardly to initial position for the eighth interval. It will thus be seen that during only one interval in each cycle the film is fed and during the remaining seven intervals the film is stationary and a picture is positioned in front of the light aperture.

When it is desired to exhibit a "still" picture, the knob 56 is partially rotated, thereby shifting the key 54 axially for disengaging the clutch. When the clutch is disengaged, the film feeding claw stops and the light interceptor ceases to rotate.

Although but one specific embodiment of his invention has been herein shown and described, it will be understood that various details of the construction shown may be altered or omitted without departing from the spirit of this invention as defined by the following claims.

I claim:

1. In a motion picture machine, a film guideway, a claw for feeding the film along said guideway, means for actuating said claw, a rotatable shaft for supporting part of said means, a driving member for rotating said shaft, a clutch for connecting said shaft with said member, said clutch comprising a pair of elements concentrically supported on said shaft, one of said elements being keyed to said shaft, the other of said elements being loose on said shaft and connected to said member, a spring normally urging said elements into frictional engagement with each other, and a control knob located in axial alinement with said shaft for separating said clutch elements axially to disengage said shaft from said member.

2. In a motion picture machine, a casing having a film guideway, a claw for feeding the film, a rotatable shaft having a longitudinally disposed slot, means on said shaft for actuating said claw, an operating belt, for rotating said shaft, a clutch for connecting said shaft with said belt, said clutch comprising an element splined on said shaft, a pulley loosely supported on said shaft and connected to said belt, a spring urging said element into frictional engagement with said pulley, a key seated in said slot and engaging said clutch element, and a control knob threaded on said casing and adapted to shift said key for separating said clutch element from said pulley.

Signed at Chicago this 19th day of June, 1929.

ABRAHAM SAPIER.